(12) United States Patent
Fukatani et al.

(10) Patent No.: US 9,561,639 B2
(45) Date of Patent: Feb. 7, 2017

(54) INTERMEDIATE FILM FOR LAMINATED GLASSES, AND LAMINATED GLASS

(75) Inventors: Juichi Fukatani, Kouka (JP); Daizou Ii, Kouka (JP); Tadahiko Yoshioka, Tokyo (JP); Masayoshi Fuji, Nagoya (JP); Kyoichi Fujimoto, Seki (JP); Chika Takai, Nagoya (JP); Kozo Hayashi, Seki (JP)

(73) Assignees: SEKISUI CHEMICAL CO., LTD., Osaka (JP); GRANDEX CO., LTD., Gifu (JP); NAGOYA INSTITUTE OF TECHNOLOGY, Aichi (JP)

(*) Notice: Subject to any disclaimer, the term of this patent is extended or adjusted under 35 U.S.C. 154(b) by 31 days.

(21) Appl. No.: 13/882,983

(22) PCT Filed: Nov. 9, 2011

(86) PCT No.: PCT/JP2011/075866
§ 371 (c)(1),
(2), (4) Date: May 17, 2013

(87) PCT Pub. No.: WO2012/063881
PCT Pub. Date: May 18, 2012

(65) Prior Publication Data
US 2013/0224466 A1    Aug. 29, 2013

(30) Foreign Application Priority Data
Nov. 9, 2010  (JP) ................................ 2010-250735

(51) Int. Cl.
*B32B 27/30* (2006.01)
*B32B 3/26* (2006.01)
(Continued)

(52) U.S. Cl.
CPC ... *B32B 17/10614* (2013.01); *B32B 17/10036* (2013.01); *B32B 17/10605* (2013.01);
(Continued)

(58) Field of Classification Search
None
See application file for complete search history.

(56) References Cited

U.S. PATENT DOCUMENTS

| 2006/0050425 A1* | 3/2006 | Muromachi et al. ......... 359/883 |
| 2007/0014976 A1* | 1/2007 | Matsudo ........... B32B 17/10018 428/212 |

FOREIGN PATENT DOCUMENTS

| JP | 59-167191 U | 11/1984 |
| JP | 04-220393 | * 8/1992 ............. B41M 5/26 |

(Continued)

OTHER PUBLICATIONS

International Search Report for the Application No. PCT/JP2011/075866 mailed Jan. 24, 2012.
(Continued)

*Primary Examiner* — David Sample
*Assistant Examiner* — Nicole T Gugliotta
(74) *Attorney, Agent, or Firm* — Cheng Law Group, PLLC

(57) ABSTRACT

The present invention provides an intermediate film for laminated glass that can increase the heat-insulating properties of laminated glass. The intermediate film for laminated glass according to the present invention is an intermediate film for laminated glass having a one-layer structure or a laminated structure of two or more layers, an intermediate film 1 for laminated glass has a first layer 2 containing silicon dioxide particles 51 having hollow parts and shell parts and having a porosity of 40% or more and 80% or less, when the intermediate film 1 for laminated glass has a one-layer structure, the first layer further contains a thermoplastic resin, and when the intermediate film 1 for laminated glass has a laminated structure of two or more layers, the intermediate film 1 for laminated glass further has a second layer 3 which is arranged on a first surface 2a side of the first layer 2 and which contains a thermoplastic resin.

8 Claims, 3 Drawing Sheets

(51) Int. Cl.
*B32B 17/10* (2006.01)
*C08K 3/36* (2006.01)
(52) U.S. Cl.
CPC .......... *B32B 17/10761* (2013.01); *C08K 3/36* (2013.01); *Y10T 428/249974* (2015.04)

(56) References Cited

FOREIGN PATENT DOCUMENTS

| | | |
|---|---|---|
| JP | 2001-39741 A | 2/2001 |
| JP | 2009-262918 A | 11/2009 |
| JP | 2009-285864 A | 12/2009 |
| WO | WO-2009/123339 A1 | 10/2009 |

OTHER PUBLICATIONS

Written Opinion of the International Searching Authority (PCT/ISA/237) for the Application No. PCT/JP2011/075866 mailed Jan. 24, 2012.

Written Opinion of the International Searching Authority (PCT/ISA/237) for the Application No. PCT/JP2011/075866 mailed Jan. 24, 2012 (English Translation mailed May 23, 2013).

\* cited by examiner

INTERMEDIATE FILM FOR LAMINATED GLASSES, AND LAMINATED GLASS

TECHNICAL FIELD

The present invention relates to an intermediate film for laminated glass used in laminated glasses employed in automobiles, buildings, and the like, and a laminated glass using the intermediate film for laminated glass.

BACKGROUND ART

Laminated glasses have less fragments of broken glass scatter even when they are subjected to an external impact to break. Thus they are excellent in safety. Therefore, the laminated glasses are widely employed in automobiles, railway vehicles, aircraft, watercraft, buildings, and the like. The laminated glasses are manufactured by interposing an intermediate film between a pair of glass plates.

The following Patent Document 1 discloses, as one example of the intermediate film for laminated glasses, an intermediate film in which at least two synthetic resin composition layers are laminated. In this intermediate film, at least one outermost layer contains an ultraviolet absorber, and is formed of a synthetic resin composition not containing an organic infrared absorber. At least one other layer is formed of a synthetic resin composition containing an organic infrared absorber.

PRIOR ART DOCUMENT

Patent Document

Patent Document 1: JP 2001-39741 A

SUMMARY OF THE INVENTION

Problems to be Solved by the Invention

Recently, a transition from a fueled car using an internal combustion engine to an electric car using an electric motor and the like has been studied. As compared to the fueled car using an internal combustion engine, the electric car using an electric motor has a problem that the distance the car can run per charge is short. Furthermore, there is a problem that, when an air conditioner is operated during running, the distance the car can run per charge is markedly reduced.

In order to increase the operation efficiency of an air conditioner, it is desirable that the heat-insulating properties of the laminated glasses used in an electric car be high. For example, a laminated glass that can prevent external heat from flowing into the car in a high-temperature environment and can prevent internal heat from flowing out of the car in a low-temperature environment is effective for increasing the operation efficiency of an air conditioner.

However, the laminated glass using a conventional intermediate film as described in Patent Document 1 has a problem that the heat-insulating properties are not enough.

An object of the present invention is to provide an intermediate film for laminated glass that can increase the heat-insulating properties of the laminated glass to be obtained when used in constituting the laminated glass, and a laminated glass using the intermediate film for laminated glass.

Means for Solving the Problems

According to a broad aspect of the present invention, an intermediate film for laminated glass having a one-layer structure or a laminated structure of two or more layers, having a first layer which contains silicon dioxide particles having hollow parts and shell parts and having a porosity of 40% or more and 80% or less, wherein, when the intermediate film is a single-layer intermediate film for laminated glass having a one-layer structure, the first layer further contains a thermoplastic resin, and when the intermediate film is a multilayer intermediate film for laminated glass having a laminated structure of two or more layers, the intermediate film for laminated glass further has a second layer which is arranged on a first surface side of the first layer and which contains a thermoplastic resin, is provided. The intermediate film for laminated glass according to the present invention may be a single-layer intermediate film for laminated glass containing only the first layer, or may be a multilayer intermediate film for laminated glass containing the first layer.

In one particular aspect of the intermediate film for laminated glass according to the present invention, the intermediate film for laminated glass has the multilayer intermediate film for laminated glass having a laminated structure of two or more layers, and the intermediate film for laminated glass comprises the first layer which contains silicon dioxide particles having hollow parts and shell parts and having a porosity of 40% or more and 80% or less and a second layer containing a thermoplastic resin.

In another particular aspect of the intermediate film for laminated glass according to the present invention, the second layer is laminated on the first surface of the first layer.

In another particular aspect of the intermediate film for laminated glass according to the present invention, the intermediate film for laminated glass further comprises a third layer which is arranged on a second surface side opposite to the first surface of the first layer and which contains a thermoplastic resin.

In further another particular aspect of the intermediate film for laminated glass according to the present invention, the third layer is laminated on the second surface of the first layer.

In another particular aspect of the intermediate film for laminated glass according to the present invention, when the thickness of the intermediate film for laminated glass is defined as T (μm), the first layer has a thickness of 0.005 T or more and 0.6 T or less.

In further another particular aspect of the intermediate film for laminated glass according to the present invention, the thermoplastic resin is a polyvinyl acetal resin.

In another particular aspect of the intermediate film for laminated glass according to the present invention, the first layer contains the silicon dioxide particles in an amount of 0.1 g/m$^2$ or more and 80 g/m$^2$ or less.

The laminated glass according to the present invention has a first component for laminated glass, a second component for laminated glass, and an intermediate film interposed between the first component for laminated glass and the second component for laminated glass, wherein the intermediate film is an intermediate film for laminated glass in accordance with the present invention.

Effect of the Invention

The intermediate film for laminated glass according to the present invention has a first layer which contains silicon dioxide particles having hollow parts and shell parts and having a porosity of 40% or more and 80% or less, wherein when the intermediate film is a single-layer intermediate film for laminated glass having a one-layer structure, the first layer further contains a thermoplastic resin, and when the intermediate film is a multilayer intermediate film for laminated glass having a laminated structure of two or more layers, the intermediate film for laminated glass further has a second layer which is arranged on a first surface side of the first layer and which contains a thermoplastic resin, therefore the heat-insulating properties of the laminated glass using the intermediate film for laminated glass according to the present invention can be increased.

MODE(S) FOR CARRYING OUT THE INVENTION

Figure 1:
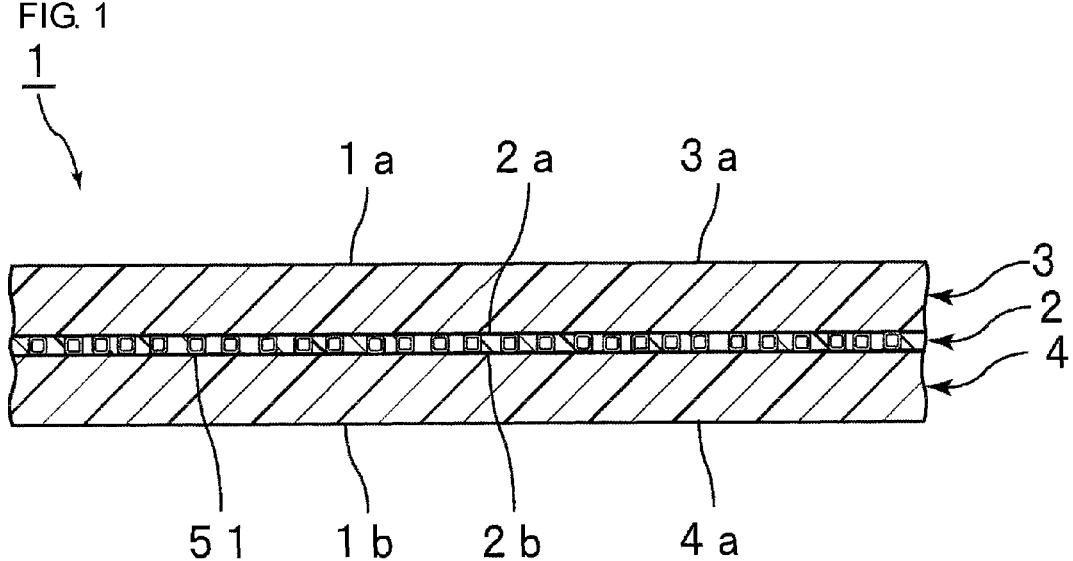
FIG. 1 is a partially cutaway cross-sectional view schematically showing an intermediate film for laminated glass according to one embodiment of the present invention.

The following will describe specific embodiments and examples of the present invention referring to the drawings, and thereby clarify the present invention.

FIG. 1 shows a partially cutaway cross-sectional view schematically showing an intermediate film for laminated glass according to one embodiment of the present invention.

An intermediate film 1 shown in FIG. 1 is a multilayer intermediate film having a laminated structure of two or more layers. The intermediate film 1 is used for obtaining a laminated glass. The intermediate film 1 is an intermediate film for laminated glass. The intermediate film 1 has a first layer 2, a second layer 3 which is arranged on a first surface 2a side of the first layer 2, and a third layer 4 which is arranged on a second surface 2b side opposite to the first surface 2a of the first layer 2. The second layer 3 is laminated on the first surface 2a of the first layer 2. The third layer 4 is laminated on the second surface 2b of the first layer 2. The first layer 2 is an intermediate layer, and mainly functions as a layer for increasing the heat-insulating properties. The second layer 3 and the third layer 4 are each a protective layer and an adhesive layer, and are each a surface layer in the present embodiment. The first layer 2 is arranged between the second layer 3 and the third layer 4. The first layer 2 is interposed between the second layer 3 and the third layer 4. Accordingly, the intermediate film 1 has a multilayer structure in which the second layer 3, the first layer 2, and the third layer 4 are laminated in this order.

Here, other layers may be laminated each between the first layer 2 and the second layer 3, and between the first layer 2 and the third layer 4. It is preferred that the first layer 2 and the second layer 3, and the first layer 2 and the third layer 4 be each directly laminated. Other layers include a layer containing a thermoplastic resin such as a polyvinyl acetal resin, and a layer containing polyethylene terephthalate or the like.

Figure 3:
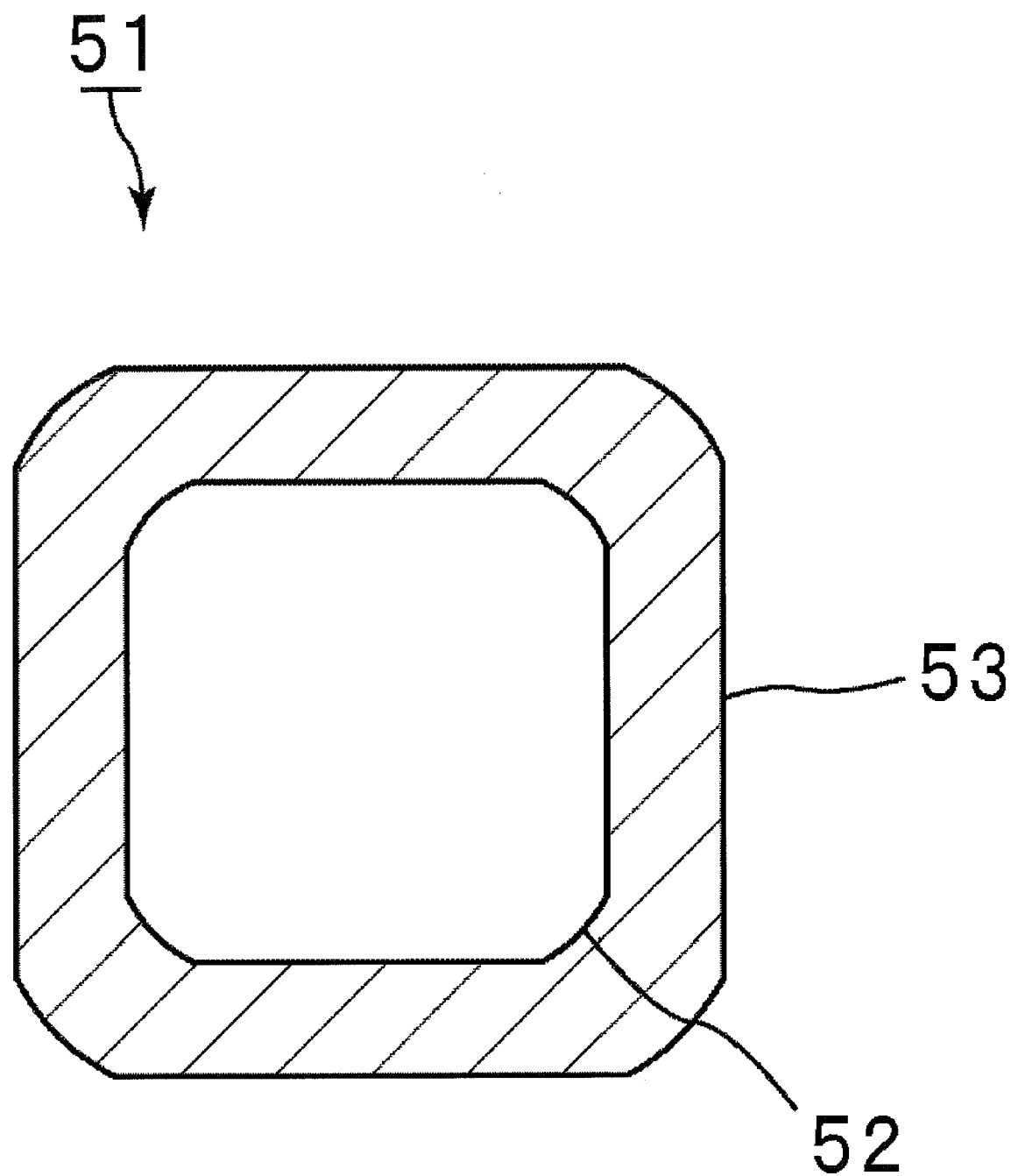
FIG. 3 is a cross-sectional view showing in an enlarged manner a silicon dioxide particle used in the intermediate film for laminated glass shown in FIG. 1.

The first layer 2 contains a plurality of silicon dioxide particles 51. FIG. 3 shows a silicon dioxide particle 51 contained in the first layer 2 in an enlarged manner. As shown in FIG. 3, the silicon dioxide particle 51 has a hollow part 52 and a shell part 53. The hollow part 52 is a void surrounded by the shell part 53. The silicon dioxide particle 51 is a hollow silicon dioxide particle having the shell part 53. The silicon dioxide particle 51 has a porosity of 40% or more and 80% or less. Accordingly, the first layer 2 contains the silicon dioxide particles 51 having the hollow parts 52 and the shell parts 53 and having a porosity of 40% or more and 80% or less.

The second layer 3 and the third layer 4 each contain a thermoplastic resin. The compositions of the second layer 3 and the third layer 4 may be the same or different.

One of the main features of the present embodiment is that the first layer 2 contains the silicon dioxide particles 51 having the hollow parts 52 and the shell parts 53 and having a porosity of 40% to 80%. Thus, the heat-insulating properties of the laminated glass using the intermediate film 1 can be considerably effectively increased.

Recently, a transition from a fueled car using an internal combustion engine to an electric car using an electric motor, a hybrid electric car using an internal combustion engine and an electric motor and the like has been progressed. The car using an electric motor specifically has a problem that the distance the car can run per charge is short. Furthermore, there is a problem that, when an air conditioner is operated during running, the distance the car can run per charge is markedly reduced.

In order to increase the operation efficiency of an air conditioner, it is desirable that the heat-insulating properties of the laminated glass used in an electric car be high. For example, a laminated glass that can prevent external heat from flowing into the car in a high-temperature environment and can prevent internal heat from flowing out of the car in a low-temperature environment is effective for increasing the operation efficiency of an air conditioner.

By the use of the laminated glass using the intermediate film 1 according to the present embodiment, the heat-insulating properties can be effectively increased. Therefore, in a car using an electric motor, an electric power consumed in the use of an air conditioner can be reduced, and the distance the car using an electric motor can run per charge can be increased.

Accordingly, the intermediate film 1 according to the present embodiment largely contributes to a transition from a fueled car using an internal combustion engine to an electric car using an electric motor, a hybrid electric car using an internal combustion engine and an electric motor, and the like. In addition, the intermediate film 1 according to the present embodiment reduces the amount of use of a petroleum fuel and largely contributes to the reduction of environmental load.

Here, even a laminated glass used in buildings, high heat-insulating properties are required to enhance air conditioning efficiency. The intermediate film 1 according to the present embodiment is useful also for a laminated glass used in buildings.

In the intermediate film 1, the second layer 3 and the third layer 4 are laminated on both sides of the first layer 2. The second layer is preferably arranged on the first surface side of the first layer, and the second layer is preferably laminated on the first surface of the first layer. The second layer is arranged only on the first surface side of the first layer, and the third layer is not required to be arranged on the second surface side of the first layer. However, the second layer is preferably arranged on the first surface side of the first layer, and the third layer is preferably arranged on the second surface side of the first layer. The third layer is preferably laminated on the second surface of the first layer. The third layer is laminated on the second surface of the first layer, whereby the penetration resistance of the laminated glass using the intermediate film 1 can be further enhanced. Furthermore, the third layer is laminated on the second surface of the first layer, thereby also enhancing the handling properties of the intermediate film 1.

Figure 4:
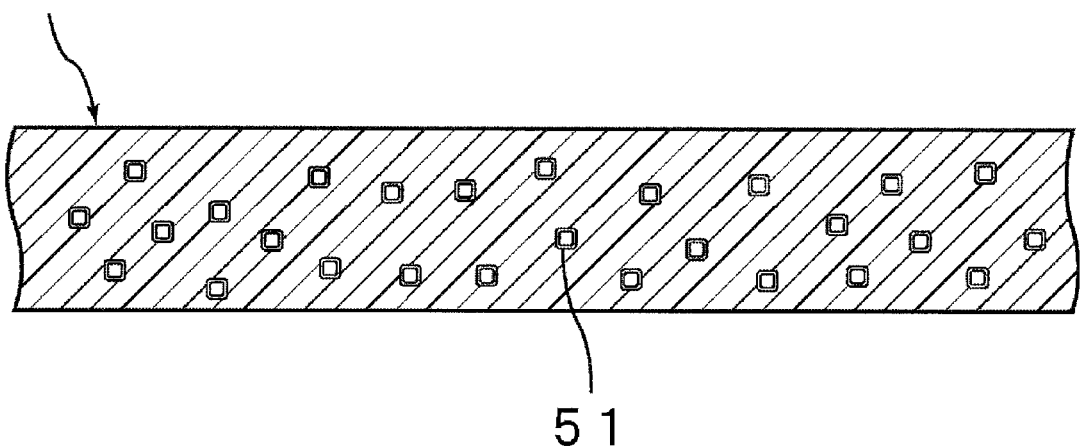
FIG. 4 is a partially cutaway cross-sectional view schematically showing an intermediate film for laminated glass according to another embodiment of the present invention.

FIG. 4 shows a partially cutaway cross-sectional view schematically showing an intermediate film for laminated glass according to another embodiment of the present invention.

The intermediate film for laminated glass shown in FIG. 4 is a single-layer intermediate film 31 having a one-layer structure. The intermediate film 31 is a first layer. The intermediate film 31 is used for obtaining a laminated glass. The intermediate film 31 is an intermediate film for laminated glass. The intermediate film 31 contains silicon dioxide particles 51 having hollow parts 52 and shell parts 53 and having a porosity of 40% or more and 80% or less, and a thermoplastic resin. Since the silicon dioxide particles 51 are used also in the intermediate film 31, the heat-insulating properties of the laminated glass using the intermediate film 31 can be increased. Here, in the intermediate film 31, the silicon dioxide particles 51 are dispersedly arranged. The silicon dioxide particles may be unevenly distributed in the intermediate film and the first layer. For example, the silicon dioxide particles may be densely distributed in a first surface side of the intermediate film and the first layer, as compared to a second surface side of the intermediate film and the first layer.

As described above, the intermediate film for laminated glass according to the present invention may be a single-layer intermediate film for laminated glass of only the first layer, or may be a multilayer intermediate film for laminated glass containing the first layer. However, the intermediate film for laminated glass according to the present invention is preferably a multilayer intermediate film for laminated glass having a laminated structure of two or more layers. In the multilayer intermediate film for laminated glass having a laminated structure of two or more layers, it is easy to partially densely distribute the silicon dioxide particles in the intermediate film for laminated glass, in order to increase heat-insulating effects. For example, the thickness of the first layer containing the silicon dioxide particles can be reduced, whereby the density of the silicon dioxide particles in the intermediate film for laminated glass can be partially increased. On the other hand, even if the thickness of the first layer is reduced, the penetration resistance of the laminated glass can be enhanced by increasing the thickness of the second layer and the third layer other than the first layer.

When the intermediate film is a single-layer intermediate film for laminated glass having a one-layer structure, the first layer further contains a thermoplastic resin. When the intermediate film is a multilayer intermediate film for laminated glass having a laminated structure of two or more layers, the intermediate film for laminated glass further has a second layer which is arranged on the first surface side of the first layer and contains a thermoplastic resin. When the intermediate film is a multilayer intermediate film for laminated glass having a laminated structure of two or more layers, the first layer preferably further contains a resin, in addition to the silicon dioxide particles. The resin is preferably a binder resin. The first layer may be a layer containing a resin such as polyethylene terephthalate and silicon dioxide particles in the resin. In addition, the first layer preferably contains a curable resin and preferably contains a thermosetting resin. Examples of the thermosetting resin include an acrylic urethane resin, an acrylic resin, a urethane resin, and the like. Among them, an acrylic urethane resin is preferable, and the thermosetting resin is preferably an acrylic resin having a urethane bond. Furthermore, when the first layer contains a curable resin, the first layer preferably contains a curing agent.

Hereinafter, details of the first layer, the second layer and the third layer constituting the intermediate film for laminated glass according to the present invention and details of the silicon dioxide particles, the thermoplastic resin and the like contained in the first layer, the second layer and the third layer will be described in detail.

(Silicon Dioxide Particles)

The first layer contains silicon dioxide particles having hollow parts and shell parts and having a porosity of 40% or more and 80% or less. The intermediate film has the first layer containing silicon dioxide particles having a porosity of 40% to 80%, whereby the heat-insulating properties of the laminated glass using the intermediate film can be increased. The porosity is preferably 45% or more, preferably 75% or less, more preferably 50% or more, more preferably 70% or less, further preferably 55% or more, and further preferably 65% or less. When the porosity is the above lower limit or more, the heat-insulating properties of the laminated glass are further increased. When the porosity is the above upper limit or less, the strength of the silicon dioxide particles is further increased, and the shell parts are unlikely to be cracked.

The outer diameter of the shell parts of the silicon dioxide particles is not particularly limited. The outer diameter of the shell parts of the silicon dioxide particles is preferably 30 nm or more, preferably 300 nm or less, more preferably 40 nm or more, more preferably 200 nm or less, further preferably 50 nm or more, and further preferably 150 nm or less. When the outer diameter is the above lower limit or more, the manufacture of the silicon dioxide particles is easy. When the outer diameter is the above upper limit or less, the heat-insulating properties of the laminated glass are further increased.

The outer diameter can be calculated by measuring outer diameters of the shell parts of arbitrary 50 silicon dioxide particles using a transmission electron microscope and arithmetically averaging the outer diameters. Here, the outer diameter means the length of a side of an outer surface of the shell parts, specifically, the length of a side of a cube when the silicon dioxide particle is approximated with the cube.

The inner diameter of the shell parts of the silicon dioxide particles is not particularly limited. The inner diameter of the shell parts of the silicon dioxide particles is preferably 10 nm or more, preferably 200 nm or less, more preferably 20 nm or more, more preferably 150 nm or less, further preferably 30 nm or more, and further preferably 100 nm or less. When the inner diameter is the above lower limit or more, the manufacture of the silicon dioxide particles is easy. When the inner diameter is the above upper limit or less, the heat-insulating properties of the laminated glass is further increased.

The inner diameter can be calculated by measuring inner diameters of the shell parts of arbitrary 50 silicon dioxide particles using a transmission electron microscope and arithmetically averaging the inner diameters. Here, the inner diameter means the length of a side of an inner surface of the shell parts, specifically, the length of a side of a cube when the hollow part is approximated with the cube.

The porosity is a value calculated from the outer diameter and the inner diameter by the following formula.

$$\text{Porosity}(\%) = (\text{Inner diameter}^3/\text{Outer diameter}^3) \times 100$$

It is preferred that the shell part of the silicon dioxide particles has a plurality of pores. The pore means a fine pore with a pore size of 2 nm or less. The pore is, for example, a through hole that penetrates through the inner surface and outer surface of the shell part. Here, the porosity does not take the void in the pore of the shell part into account.

The density of the shell part is not particularly limited. The density of the shell part is preferably 0.5 g/cm$^3$ or more, preferably 1.9 g/cm$^3$ or less, more preferably 0.7 g/cm$^3$ or more, more preferably 1.7 g/cm$^3$ or less, further preferably 0.9 g/cm$^3$ or more, and further preferably 1.5 g/cm$^3$ or less. When the density is the above lower limit or more and the above upper limit or less, the heat-insulating properties of the laminated glass is further increased.

The content of the silicon dioxide particles contained in the first layer is not particularly limited. The content of the silicon dioxide particles is preferably 5% by weight or more, preferably 50% by weight or less, more preferably 10% by weight or more, more preferably 40% by weight or less, further preferably 7% by weight or more, further preferably 20% by weight or less, particularly preferably 10% by weight or less, and most preferably 8% by weight or less, in 100% by weight of the first layer. When the content of the silicon dioxide particles is the above lower limit or more, the heat-insulating properties of the laminated glass are further increased. When the content of the silicon dioxide particles is the above upper limit or less, the transparency of the laminated glass is increased.

When the intermediate film is a multilayer intermediate film for laminated glass having a laminated structure of two or more layers, the content of the silicon dioxide particles is 5% by weight or more, 50% by weight or less, more preferably 10% by weight or more, more preferably 40% by weight or less, further preferably 7% by weight or more, further preferably 20% by weight or less, particularly preferably 10% by weight or less, and most preferably 8% by weight or less, in 100% by weight of the first layer. In this case, the heat-insulating properties and transparency of the laminated glass using a multilayer intermediate film are further improved.

In addition, the content of the silicon dioxide particles in the first layer is preferably 0.1 g/m$^2$ or more, preferably 80 g/m$^2$ or less, more preferably 0.5 g/m$^2$ or more, more preferably 10 g/m$^2$ or less, further preferably 1 g/m$^2$ or more, and further preferably 8 g/m$^2$ or less. When the content of the silicon dioxide particles is the above lower limit or more, the heat-insulating properties of the laminated glass are further increased. When the content of the silicon dioxide particles is the above upper limit or less, the transparency of the laminated glass is increased.

When the intermediate film is a multilayer intermediate film for laminated glass having a laminated structure of two or more layers, the content of the silicon dioxide particles is particularly preferably 0.2 g/m$^2$ or more and 70 g/m$^2$ or less, in 100% by weight of the first layer. In this case, the heat-insulating properties and transparency of the laminated glass using a multilayer intermediate film are further improved.

The present inventors found that an intermediate film for laminated glass having further improved heat-insulating properties is obtained by adjusting the content of the silicon dioxide particles in the first layer (% by weight×0.01) and the thickness of the first layer (μm). Furthermore, in order to obtain an intermediate film for laminated glass having further improved heat-insulating properties, a preferred lower limit of a product of the content of the silicon dioxide particles in the first layer (% by weight×0.01) and the thickness of the first layer (μm) is 0.1, and a preferred upper limit thereof is 60. When the product is the above lower limit or more and the above upper limit or less, the heat-insulating properties of the laminated glass are further increased. A more preferred lower limit of the product is 0.2, a further preferred lower limit is 0.3, a particularly preferred lower limit is 0.4, a more preferred upper limit is 54, a further preferred upper limit is 48, and a particularly preferred upper limit is 42.

The porosity of the silicon dioxide particles is 40% or more, and the shell parts of the silicon dioxide particles are sufficiently thin, therefore, a laminated glass with high transparency can be obtained. Furthermore, the heat-insulating properties can be increased even if the thickness of the first layer is thin. Therefore, the reduction of transparency of the laminated glass due to use of the silicon dioxide particles is suppressed, and a laminated glass with sufficiently high transparency can be obtained.

The method for manufacturing the silicon dioxide particles is not particularly limited. One example of the method for manufacturing the silicon dioxide particles is described below.

The crystal of calcium carbonate particles to be a nucleus is grown. The crystal of calcium carbonate particles is calcite and a hexagonal crystal, but the crystal can be grown to the shape of a cubic crystal by controlling the synthesis conditions.

Next, for example, the crystal is grown so as to have an outer diameter of the calcium carbonate particles of 10 to 180 nm, then undergoes a aging process and is dehydrated to obtain a hydrated calcium carbonate particle slurry containing 70% by weight or more of the calcium carbonate particles.

A dispersion obtained by dispersing the hydrated calcium carbonate particle slurry in ethanol, silicon alkoxide and ammonia are mixed, and the surface of the calcium carbonate particles is coated with silicon dioxide by a sol-gel method. The calcium carbonate particles coated with silicon dioxide are washed and then dispersed in water to obtain a dispersion. Hydrochloric acid is added to the dispersion, and the calcium carbonate particles are dissolved, whereby hollow particles having outflow pores from which calcium carbonate flowed out can be obtained. Furthermore, hollow particles are heated to 200 to 800° C., whereby the outflow pores can be closed, so that silicon dioxide particles having hollow parts and shell parts can be manufactured. Here, while it is not necessary to close all the outflow pores, it is preferred that a fine pore with a pore size exceeding 2 nm is not present in the silicon dioxide particles.

In addition, the method for manufacturing silicon dioxide particles preferably includes a first step of growing a crystal of calcium carbonate particles, a second step of coating with silicon dioxide the surface of the calcium carbonate particles having been subjected to crystal growth, a third step of dissolving the calcium carbonate particles to form hollow particles in which hollow parts are formed, and a fourth step of heating the hollow particles. The manufacturing method as described above is used, whereby silicon dioxide particles having low thermal conductivity and high heat-insulating properties can be obtained.

Examples of the first step include a step of dispersing calcium carbonate with a primary particle size by a transmission electron microscope of 20 to 200 nm in water, and aging calcium carbonate so as to have a particle size of 20 to 700 nm by a static light scattering method.

Examples of the second step include a step of dehydrating the aged calcium carbonate to make a wet cake, and mixing the wet cake with alcohol, furthermore, mixing with aqueous ammonia, water, and silicon alkoxide, and coating the surface of calcium carbonate with silicon dioxide. Here, when mixing the wet cake with aqueous ammonia, water, and silicon alkoxide, the amount of each component is preferably adjusted as follows.

The volume ratio of silicon alkoxide to the alcohol (volume of silicon alkoxide/volume of alcohol) is preferably 0.002 or more and 0.1 or less. The amount of ammonia contained in the aqueous ammonia is preferably 4 mol or more and 15 mol or less based on 1 mol of silicon alkoxide. The amount of water is preferably 25 mol or more and 200 mol or less based on 1 mol of silicon alkoxide.

Examples of the third step include a step of mixing calcium carbonate coated with silicon dioxide with water, further adding an acid thereto, adjusting the acid concentration to 0.1 to 3 mol/L, and dissolving the calcium carbonate particles to form hollow particles in which hollow parts are formed.

Examples of the fourth step include a step of heating the hollow particles to 200 to 800° C.

The surface of the silicon dioxide particles may be treated with a surface modifier, or may be coated with a surface modifier. Examples of the surface modifier include a compound having an isocyanate group such as triethoxy propyl isocyanate silane and isocyanate, a compound having an isocyanurate group, a compound having an alkyl group such as triethoxybutylsilane, a compound having a vinyl group such as triethoxypropylvinylsilane, and a compound having an acryloxy group such as triethoxypropylacryloxysilane. By the use of the surface modifier, the dispersibility of the silicon dioxide particles in the first layer can be increased.

The shape of the silicon dioxide particles is not particularly limited. The silicon dioxide particles are preferably approximately cube-shaped.

(Thermoplastic Resin)

When the intermediate film is a single-layer intermediate film for laminated glass having a one-layer structure, the first layer contains a thermoplastic resin. When the intermediate film is a multilayer intermediate film for laminated glass having a laminated structure of two or more layers, the second layer and the third layer each contain a thermoplastic resin. Only one type of thermoplastic resin may be used, or two or more types may be used in combination. The thermoplastic resin contained in the second layer and the third layer may be the same or different.

The thermoplastic resin is not particularly limited. A conventionally known thermoplastic resin can be used as the thermoplastic resin. Only one type of thermoplastic resin may be used, or two or more types may be used in combination.

Examples of the thermoplastic resin include a polyvinyl acetal resin, an ethylene-vinyl acetate copolymer resin, an ethylene-acrylic copolymer resin, a polyurethane resin, a polyvinyl alcohol resin, and the like.

The thermoplastic resin is preferably a polyvinyl acetal resin. In addition, by a combination use of a polyvinyl acetal resin and a plasticizer, the adhesion of a layer containing the thermoplastic resin to a component for laminated glass or other layer can be further increased.

The content rate of hydroxyl groups of the polyvinyl acetal resin (hydroxyl group amount) is preferably 10% by mol or more and preferably 50% by mol or less. When the content rate of hydroxyl groups is the above lower limit or more, bleed out of the plasticizer is unlikely to occur, and the moisture resistance of the intermediate film is further increased. In addition, when the content rate of hydroxyl groups is the above upper limit or less, the penetration resistance of the laminated glass is further increased. Furthermore, the flexibility of the intermediate film is increased, and handling of the intermediate film is facilitated. The content rate of hydroxyl groups of the polyvinyl acetal resin (hydroxyl group amount) is more preferably 20% by mol or more, further preferably 30% by mol or more, and more preferably 40% by mol or less.

The content rate of hydroxyl groups of the polyvinyl acetal resin is a molar fraction obtained by dividing the amount of ethylene groups to which a hydroxyl group is bonded by the amount of the whole ethylene groups of a main chain, which is expressed in percentage (% by mol). The content rate of hydroxyl groups can be measured, for example, in accordance with JIS K6728 "testing methods for polyvinyl butyral".

The acetylation degree of the polyvinyl acetal resin is preferably 0.1% by mol or more and preferably 10% by mol or less. When the acetylation degree is the above lower limit or more, the moisture resistance of the intermediate film and the laminated glass are increased. When the acetylation degree is the above upper limit or less, the strength of the intermediate film is increased, and bleed out of the plasticizer can be suppressed. The acetylation degree of the polyvinyl acetal resin is more preferably 0.5% by mol or more, more preferably less than 3% by mol, and further preferably 2% by mol or less.

The acetylation degree is a molar fraction obtained by subtracting the amount of ethylene groups to which an acetal group is bonded and the amount of ethylene groups to which a hydroxyl group is bonded from the amount of the whole ethylene groups of a main chain and dividing the resulting value by the amount of the whole ethylene groups of a main chain, which is expressed in percentage (% by mol). The amount of ethylene groups to which an acetal group is bonded can be measured, for example, in accordance with JIS K6728 "testing methods for polyvinyl butyral".

The polyvinyl acetal resin can be produced by, for example, acetalizing polyvinyl alcohol with an aldehyde. Polyvinyl alcohol can be obtained by, for example, saponifying polyvinyl acetate. The degree of saponification of polyvinyl alcohol is generally within a range of 80 to 99.8% by mol.

The average degree of polymerization of polyvinyl alcohol is preferably 200 or more, more preferably 500 or more, further preferably 1600 or more, particularly preferably 2600 or more, most preferably 2700 or more, preferably 5000 or less, more preferably 4000 or less, and further preferably 3500 or less. When the average degree of polymerization is the above lower limit or more, the penetration resistance of the laminated glass is further increased. When the average degree of polymerization is the above upper limit or less, formation of the intermediate film is facilitated.

From the viewpoint of further increasing the penetration resistance of the laminated glass, the average degree of polymerization of polyvinyl alcohol is particularly preferably 2700 or more and 5000 or less.

The number of carbon atoms of the acetal group contained in the polyvinyl acetal resin is not particularly limited. The aldehyde used in manufacturing the polyvinyl acetal resin is not particularly limited. The number of carbon atoms of the acetal group contained in the polyvinyl acetal resin is preferably 3 to 5 and more preferably 3 or 4.

The aldehyde is not particularly limited. As the aldehyde, generally, an aldehyde having 1 to 10 carbon atoms is suitably used. Examples of the aldehyde having 1 to 10 carbon atoms include propionaldehyde, n-butylaldehyde, isobutylaldehyde, n-valeraldehyde, 2-ethylbutyl aldehyde, n-hexylaldehyde, n-octylaldehyde, n-nonylaldehyde, n-decylaldehyde, formaldehyde, acetaldehyde, benzaldehyde, and the like. Among them, propionaldehyde, n-butylaldehyde, isobutylaldehyde, n-hexylaldehyde or n-valeraldehyde is preferable, propionaldehyde, n-butylaldehyde or isobutylaldehyde is more preferable, and n-butylaldehyde is further preferable. Only one type of aldehyde may be used, or two or more types may be used in combination.

(Plasticizer)

When the intermediate film is a single-layer intermediate film for laminated glass having a one-layer structure, the first layer preferably further contains a plasticizer, in addition to a thermoplastic resin. When the intermediate film is a multilayer intermediate film for laminated glass having a laminated structure of two or more layers, the second layer and the third layer each preferably further contain a plasticizer, in addition to a thermoplastic resin. Only one type of plasticizer may be used, or two or more types may be used in combination. The plasticizer contained in the second layer and the third layer may be the same or different.

Examples of the plasticizer include organic ester plasticizers such as monobasic organic acid esters and polybasic organic acid esters, phosphate plasticizers such as organic phosphate plasticizers and organic phosphite plasticizers, and the like. Among them, an organic ester plasticizer is preferable. The plasticizer is preferably a liquid plasticizer.

The monobasic organic acid ester is not particularly limited and examples thereof include a glycol ester obtained by a reaction of a glycol with a monobasic organic acid, an ester of triethylene glycol or tripropylene glycol and a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptylic acid, n-octylic acid, 2-ethylhexylic acid, n-nonylic acid, decylic acid, and the like.

The polybasic organic acid ester is not particularly limited and examples thereof include ester compounds of a polybasic organic acid and a linear or branched alcohol having 4 to 8 carbon atoms. Examples of the polybasic organic acid include adipic acid, sebacic acid, azelaic acid, and the like.

The organic ester plasticizer is not particularly limited, and examples thereof include triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutylcarbitol adipate, ethylene glycol di-2-ethylbutyrate, 1,3-propylene glycol di-2-ethylbutyrate, 1,4-butyleneglycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptylnonyl adipate, dibutyl sebacate, oil-modified alkyd sebacate, a mixture of a phosphate and an adipate, and the like. Other organic ester plasticizers may also be used.

The organic phosphate plasticizer is not particularly limited and examples thereof include tributoxyethyl phosphate, isodecylphenyl phosphate, triisopropyl phosphate, and the like.

The plasticizer is preferably a diester plasticizer represented by the following formula (1).

[Chem. 1]

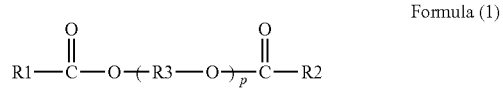

Formula (1)

In the formula (1), R1 and R2 each represent an organic group having 5 to 10 carbon atoms, R3 represents an ethylene group, an isopropylene group, or a n-propylene group, and p represents an integer of 3 to 10. R1 and R2 in the formula (1) are each preferably an organic group having 6 to 10 carbon atoms.

The plasticizer preferably contains at least one of triethylene glycol di-2-ethylhexanoate (3GO) and triethylene glycol di-2-ethylbutyrate (3 GH), and more preferably contains triethylene glycol di-2-ethylhexanoate.

In the layer containing a thermoplastic resin and a plasticizer, the content of the plasticizer is preferably 10 parts by weight or more and preferably 70 parts by weight or less, based on 100 parts by weight of the polyvinyl acetal resin. In the layer containing a thermoplastic resin and a plasticizer, the content of the plasticizer is more preferably 15 parts by weight or more and more preferably 60 parts by weight or less, based on 100 parts by weight of the polyvinyl acetal resin. In addition, when the content of the plasticizer is the above lower limit or more, the penetration resistance of the laminated glass is further increased. When the content of the plasticizer is the above upper limit or less, the transparency of the intermediate film is further increased.

(Other Components)

The first layer preferably contains a resin, in addition to the silicon dioxide particles. The resin is preferably a binder resin. The binder resin may be the thermoplastic resin described above. The first layer may contain a polyvinyl acetal resin and a plasticizer.

Examples of the binder resin include a vinyl resin, a thermoplastic resin, a curable resin, a thermoplastic block copolymer, an elastomer, and the like. Only one type of binder resin may be used, or two or more types may be used in combination.

Examples of the vinyl resin include a vinyl acetate resin, an acrylic resin, a styrene resin, and the like. Examples of the thermoplastic resin include a polyolefin resin, a polyvinyl acetal resin, an ethylene-vinyl acetate copolymer resin, an ethylene-acrylic copolymer resin, a polyurethane resin, a polyvinyl alcohol resin, a polyamide resin, and the like. Examples of the curable resin include an epoxy resin, a urethane resin, a polyimide resin, an unsaturated polyester resin, and the like. The curable resin is preferably an acrylic urethane resin. The curable resin is preferably an acrylic resin having a urethane bond. By heating using an acrylic urethane resin, a complex of the resin and the silicon dioxide particles can be formed. Therefore, when the first layer contains an acrylic urethane resin, the thermal stability of the first layer is further increased. Here, the curable resin may be a room temperature curable resin, a thermosetting resin, a photo-curable resin, or a moisture-curable resin. Examples of the thermoplastic block copolymer include a styrenebutadiene-styrene block copolymer, a styrene-isoprene-styrene block copolymer, a hydrogenated styrene-butadiene-styrene block copolymer, a hydrogenated styrene-isoprene-styrene block copolymer, and the like. Examples of the elastomer include a styrene-butadiene copolymer rubber, an acrylonitrile-styrene block copolymer rubber, and the like.

The intermediate film for laminated glass according to the present invention may contain additives such as an ultraviolet absorber, an antioxidant, a light stabilizer, a flame retardant, an antistatic agent, a pigment, a dye, an adhesion regulator, an anti-moisture agent, a fluorescent brightener, and an infrared absorber, as necessary. There additives may be used alone, or two or more types may be used in combination.

(Intermediate Film for Laminated Glass)

In a case where an intermediate film for laminated glass is a multilayer intermediate film for laminated glass having a laminated structure of two or more layers, when the thickness of the intermediate film for laminated glass is defined as T (μm), the first layer has a thickness of preferably 0.005 T or more, more preferably 0.3 T or more, preferably 0.6 T or less, more preferably 0.05 T or more, more preferably 0.55 T or less, and further preferably 0.5 T or less. When the thickness of the first layer is the above lower limit or more, the heat-insulating properties of the laminated glass are further increased. When the thickness of the first layer is the above upper limit or less, the transparency and handling properties of the laminated glass are further increased.

The intermediate film for laminated glass of the present invention has a thickness of preferably 0.1 mm or more, preferably 3 mm or less, more preferably 0.25 mm or more, and more preferably 1.5 mm or less. When the thickness of the intermediate film is the above lower limit or more, the penetration resistance of the intermediate film and the laminated glass is sufficiently increased. When the thickness of the intermediate film is the above upper limit or less, the transparency of the intermediate film is further improved.

The method for manufacturing the intermediate film for laminated glass according to the present invention is not particularly limited. As the method for manufacturing the intermediate film, a conventionally known method can be used. Examples of the method include a manufacturing method of kneading a thermoplastic resin such as a polyvinyl acetal resin with other components such as a plasticizer contained as necessary to form an intermediate film, and the like. A manufacturing method of extrusion molding is preferable since it is suitable for continuous production.

The kneading method is not particularly limited. Examples of the method include methods using an extruder, a plastograph, a kneader, a Banbury mixer, a calender roll, or the like. Among them, a method using an extruder is preferable and a method using a twin screw extruder is more preferable, since these methods are suitable for continuous production. Here, the intermediate film for laminated glass according to the present invention may be obtained by separately preparing a first layer, the second layer and the third layer, and thereafter laminating the first layer, the second layer and the third layer to obtain a multilayer intermediate film or may be obtained by laminating a first layer, the second layer and the third layer by co-extrusion to obtain an intermediate film.

In addition, a material containing silicon dioxide particles may be applied to the surface of a second layer or the third layer to form a first layer, to obtain an intermediate film.

(Laminated Glass)

Figure 2:
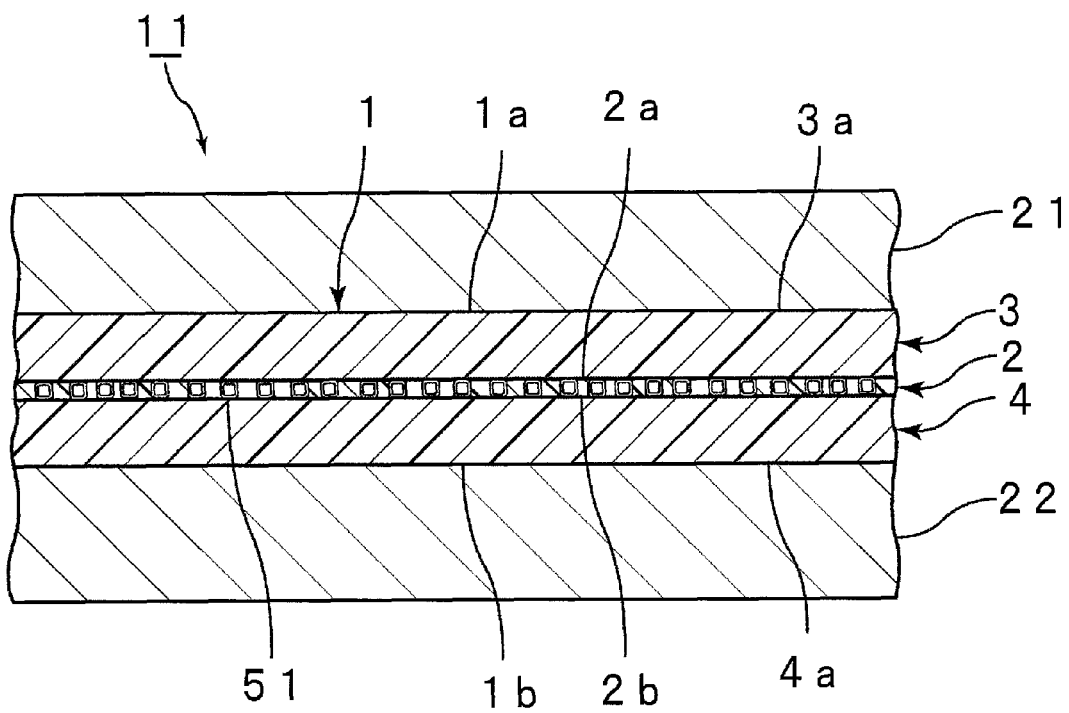
FIG. 2 is a partially cutaway cross-sectional view schematically showing one example of a laminated glass using the intermediate film for laminated glass shown in FIG. 1.

FIG. 2 shows a cross-sectional view of one example of a laminated glass using the intermediate film for laminated glass according to one embodiment of the present invention.

A laminated glass 11 shown in FIG. 2 has an intermediate film 1, a first component for laminated glass 21 and a second component for laminated glass 22. The intermediate film 1 is interposed between the first component for laminated glass 21 and the second component for laminated glass 22. The first component for laminated glass 21 is laminated on a first surface 1a of the intermediate film 1. The second component for laminated glass 22 is laminated on a second surface 1b opposite to the first surface 1a of the intermediate film 1. The first component for laminated glass 21 is laminated on an outer surface 3a of a second layer 3. The second component for laminated glass 22 is laminated on an outer surface 4a of a third layer 4.

As described above, the laminated glass according to the present invention has a first component for laminated glass, a second component for laminated glass, and an intermediate film interposed between the first component for laminated glass 21 and the second component for laminated glass 22, and the intermediate film for laminated glass of the present invention is used as the intermediate film.

Examples of the first component for laminated glass and the second component for laminated glass include a glass plate, a PET (polyethylene terephthalate) film, and the like. The laminated glass is not limited only to a laminated glass in which an intermediate film is interposed between two glass plates, and may be a laminated glass in which an intermediate film is interposed between a glass plate and a PET film or the like. The laminated glass is a laminate including a glass plate, and it is preferred that at least one glass plate is used.

Examples of the glass plate include inorganic glasses and organic glasses. Examples of the inorganic glass include a float plate glass, a heat-absorbing plate glass, a heat reflective plate glass, a polished plate glass, a figured glass, a wired glass, a lined glass, a green glass, and the like. The organic glass is a synthetic resin glass substituted for an inorganic glass. Examples of the organic glass include a polycarbonate plate, a poly(meth)acrylic resin plate, and the like. Examples of the poly(meth)acrylic resin plate include a polymethyl(meth)acrylate plate and the like.

The thickness of the first component for laminated glass and the second component for laminated glass is not particularly limited, and is preferably within a range of 1 to 5 mm. When the component for laminated glass is a glass plate, the thickness of the glass plate is preferably within a range of 1 to 5 mm. When the component for laminated glass is a PET film, the thickness of the PET film is preferably within a range of 0.03 to 0.5 mm.

The method for manufacturing the laminated glass is not particularly limited. For example, the intermediate film is interposed between the first component for laminated glass and the second component for laminated glass, and the laminate is passed through a pressing roller or put in a rubber bag and sucked under reduced pressure to deaerate the air remaining between the first component for laminated glass and the second component for laminated glass and the intermediate film. Thereafter, the resulting laminate is preliminarily adhered at about 70 to 110° C. to obtain a laminate. Next, the laminate is placed in an autoclave or pressed, and pressure-bonded at about 120 to 150° C. and a pressure of 1 to 1.5 MPa. A laminated glass can be obtained as described above.

The laminated glass can be employed in automobiles, railway vehicles, aircraft, watercraft, buildings, and the like. The laminated glass can also be employed for applications other than these. The intermediate film is excellent in heat-insulating properties, thus is preferably an intermediate film for buildings or for vehicles and more preferably an intermediate film for vehicles. The laminated glass is preferably a laminated glass for buildings or for vehicles and more preferably a laminated glass for vehicles. The intermediate film and the laminated glass are suitably used in a car using an electric motor. Specifically, the intermediate film and the laminated glass are suitably used in an electric car using an electric motor and a hybrid electric car using an internal combustion engine and an electric motor. The laminated glass can be used in windshields, side glass, rear windshields or roof glass of automobiles, and the like.

Hereinafter, the present invention will be described in more detail by way of examples. The present invention is not limited only to the following examples.

Example 1

(1) Manufacture of Silicon Dioxide Particles Having Hollow Parts and Shell Parts ("Nanoballoon" Manufactured by GRANDEX Co., Ltd)

Crystals of calcium carbonate particles were grown, then aged, and dehydrated to be made into a hydrated calcium carbonate particle slurry, followed by dispersing in ethanol. Silicon alkoxide and ammonia were added thereto, and the resultant was coated with silica ($SiO_2$) by a sol-gel method. The particles coated with silica were washed, then dispersed in water, hydrochloric acid was added thereto to allow the inner calcium carbonate to dissolve and flow out, thereby preparing hollow particles having cube-shaped shell parts (silica shell) having outflow pores and hollow parts. The hollow particles were dried, then heated at 400° C. for 0.5 hours in the heating step, and pores from which dissolved calcium carbonate flowed out were closed, thereby manufacturing silicon dioxide particles having hollow parts and shell parts ("Nanoballoon" manufactured by GRANDEX Co., Ltd).

(2) Resin Composition for Forming First Layer

A mixture of 1000 parts by weight of ethyl acetate and 100 parts by weight of silicon dioxide particles having hollow parts and shell parts ("Nanoballoon" manufactured by GRANDEX Co., Ltd, porosity: 59%, outer diameter: 100 nm, inner diameter: 84 nm, shell thickness: 8 nm) was mixed using a stirring device, to obtain a dispersion.

616 parts by weight of the dispersion, 100 parts by weight of a polyvinyl butyral resin (butyralization degree: 68.5% by mol, content rate of hydroxyl groups: 30.5% by mol, amount of acetyl groups: 1% by mol), and 40 parts by weight of triethylene glycol di-2-ethylhexanoate as a plasticizer were mixed, to obtain a resin composition for forming a first layer.

(3) Resin Composition for Forming Second Layer and Third Layer 100 parts by weight of a polyvinyl butyral resin (butyralization degree: 68.5% by mol, content rate of hydroxyl groups: 30.5% by mol, amount of acetyl groups: 1% by mol), and 40 parts by weight of triethylene glycol di-2-ethylhexanoate as a plasticizer were mixed, to obtain a resin composition for forming a second layer and a third layer.

(4) Preparation of Intermediate Film for Laminated Glass

The resulting first resin composition, the second resin composition and the third resin composition were co-extruded, thereby obtaining an intermediate film for laminated glass in which the second layer (thickness: 350 μm), the first layer (thickness: 100 μm), and the third layer (thickness: 350 μm) were laminated in this order.

(5) Preparation of Laminated Glass

The resulting intermediate film for laminated glass was laminated between two float glasses (1 cm long×1 cm wide×2.5 mm thick), and put in a rubber bag and sucked under reduced pressure to deaerate the air remaining between the float glasses and the intermediate film for laminated glass and preliminarily adhered at 110° C. to obtain a laminate. Next, the laminate was placed in an autoclave and pressure-bonded at 120° C. and a pressure of 1.5 MPa to obtain a laminated glass.

Example 2

(1) Resin Composition for Forming First Layer

A mixture of 1000 parts by weight of ethyl acetate and 50 parts by weight of silicon dioxide particles having hollow parts and shell parts ("Nanoballoon" manufactured by GRANDEX Co., Ltd, porosity: 63%, outer diameter: 93 nm, inner diameter: 80 nm, shell thickness: 6.6 nm) was mixed using a stirring device, to obtain a dispersion.

169 parts by weight of the dispersion and 100 parts by weight of an acrylic urethane resin (manufactured by Bayer Materialscience AG) were mixed to obtain a resin composition for forming a first layer.

(2) Resin Composition for Forming Second Layer and Third Layer 100 parts by weight of a polyvinyl butyral resin (butyralization degree: 68.5% by mol, content rate of hydroxyl groups: 30.5% by mol, amount of acetyl groups: 1% by mol), and 40 parts by weight of triethylene glycol di-2-ethylhexanoate as a plasticizer were mixed, to obtain a resin composition for forming a second layer and a third layer.

(3) Preparation of Intermediate Film for Laminated Glass

The resin composition for forming a second layer and a third layer was press molded at 170° C. to prepare second layer and third layer with a thickness of 200 μm. The resin composition for forming a first layer was applied to one surface of the resulting second layer, and ethyl acetate was volatilized, to prepare a first layer with a thickness of 200 μm. Furthermore, the third layer was laminated on the surface of the first layer and press molded at 170° C., thereby preparing an intermediate film for laminated glass in which the second layer (thickness: 200 μm), the first layer (thickness: 200 μm), and the third layer (thickness: 200 μm) were laminated in this order.

(4) Preparation of Laminated Glass

The resulting intermediate film for laminated glass was laminated between two float glasses (1 cm long×1 cm wide×2.5 mm thick), and put in a rubber bag and sucked under reduced pressure to deaerate the air remaining between the float glasses and the intermediate film for laminated glass and preliminarily adhered at 110° C. to obtain a laminate. Next, the laminate was placed in an autoclave and pressure-bonded at 120° C. and a pressure of 1.5 MPa to obtain a laminated glass.

Example 3

The same procedures were carried out as in Example 2 except that the thickness of the first layer was changed to 311 μm by changing the thickness when applying the resin composition for forming a first layer, to obtain an intermediate film for laminated glass and a laminated glass.

Example 4

The same procedures were carried out as in Example 2 except that the thickness of the first layer was changed to 467 μm by changing the thickness when applying the resin composition for forming a first layer, to obtain an intermediate film for laminated glass and a laminated glass.

Example 5

The same procedures were carried out as in Example 2 except that the thickness of the first layer was changed to 533 μm by changing the thickness when applying the resin composition for forming a first layer, to obtain an intermediate film for laminated glass and a laminated glass.

Comparative Example 1

100 parts by weight of a polyvinyl butyral resin (butyralization degree: 68.5% by mol, content rate of hydroxyl groups: 30.5% by mol, amount of acetyl groups: 1% by mol), and 40 parts by weight of triethylene glycol di-2-ethylhexanoate as a plasticizer were mixed, to obtain a resin composition. The resulting resin composition was extruded to obtain an intermediate film for laminated glass with a thickness of 800 μm. Furthermore, a laminated glass was obtained in the same manner as in Example 1.

(Evaluation)

(1) Heat-Insulating Properties

The thermal conductivity of the resulting laminated glass was measured by a laser flash method using a thermal conductivity measuring apparatus ("TC-7000" manufactured by ULVAC-RIKO, Inc.). The thermal conductivity of the laminated glass of Example 1 was 1.06 W/m·K, and the thermal conductivity of the laminated glass of Comparative Example 1 was 1.31 W/m·K.

In addition, the intermediate film for laminated glass of Examples 2 to 5 and Comparative Example 1 were bonded to one stainless steel (SUS) substrate (circular disc of 60 mm diameter×5 mm thick) to prepare a sample for evaluating heat-insulating properties (hereinafter, also referred to as a sample). The resulting sample was interposed between two metal plates at a pressure of 0.4 MPa, and the thermal conductivity of the sample was measured using a thermal conductivity measuring apparatus ("HC-110" manufactured by EKO Instruments). The upper metal plate and the lower metal plate were set at 28° C. and 22° C., respectively. The measurement required 2 hours. The thermal conductivity of the sample of Example 2 was 0.128 Wm·K, the thermal conductivity of the sample of Example 3 was 0.103 Wm·K, the thermal conductivity of the sample of Example 4 was 0.111 Wm·K, the thermal conductivity of the sample of Example 5 was 0.120 W/m·K, and the thermal conductivity of the sample of Comparative Example 1 was 0.146 W/m·K.

EXPLANATION OF SYMBOLS

1 Intermediate film
1a First surface
1b Second surface
2 First layer
2a First surface
2b Second surface
3 Second layer
3a Outer surface
4 Third layer
4a Outer surface
11 Laminated glass
21 First component for laminated glass
22 Second component for laminated glass
31 Intermediate film
51 Silicon dioxide particle
52 Hollow part
53 Shell part

The invention claimed is:

1. An intermediate film for laminated glass which is a multilayer intermediate film for laminated glass having a laminated structure of two or more layers, comprising:
a first layer which contains silicon dioxide particles having hollow parts and shell parts and having a porosity of 40% or more and 80% or less, which further contains a polyvinyl butyral resin or an acrylic urethane resin as a binder resin, and which has a thickness in μm of 0.005 T or more and 0.6 T or less when the thickness in μm of the intermediate film for laminated glass is defined as T, wherein a product of the content of the silicon dioxide particles in the first layer in % by weight×0.01 and the thickness in μm of the first layer is 0.1 or more and 60 or less, and wherein the first layer contains the silicon dioxide particles in an amount of 0.1 g/m² or more and 80 g/m² or less, and
a second layer which is arranged on a first surface side of the first layer and which contains a thermoplastic resin.

2. The intermediate film for laminated glass according to claim 1,
wherein the second layer is laminated on the first surface of the first layer.

3. The intermediate film for laminated glass according to claim 1, further comprising:
a third layer which is arranged on a second surface side opposite to the first surface of the first layer and which contains a thermoplastic resin.

4. The intermediate film for laminated glass according to claim 3,
wherein the third layer is laminated directly on the second surface of the first layer.

5. The intermediate film for laminated glass according to claim 1,
wherein the first layer contains the polyvinyl butyral resin.

6. A laminated glass comprising:
a first component for laminated glass,
a second component for laminated glass, and
an intermediate film interposed between the first component for laminated glass and the second component for laminated glass,
wherein the intermediate film is the intermediate film for laminated glass according to claim 1.

7. The intermediate film for laminated glass according to claim 1,
   wherein the first layer contains the polyvinyl butyral resin, and
   the thermoplastic resin contained in the second layer is a polyvinyl acetal resin.

8. The intermediate film for laminated glass according to claim 3,
   wherein the first layer contains the polyvinyl butyral resin, and the thermoplastic resin contained in the second layer and the thermoplastic resin contained in the third layer each are a polyvinyl acetal resin.

\* \* \* \* \*